United States Patent Office
3,093,213
Patented June 11, 1963

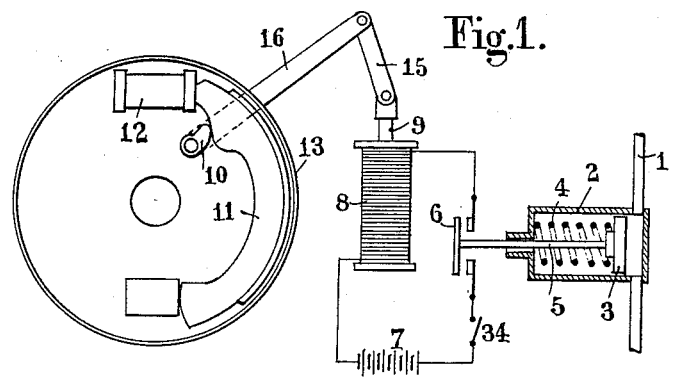
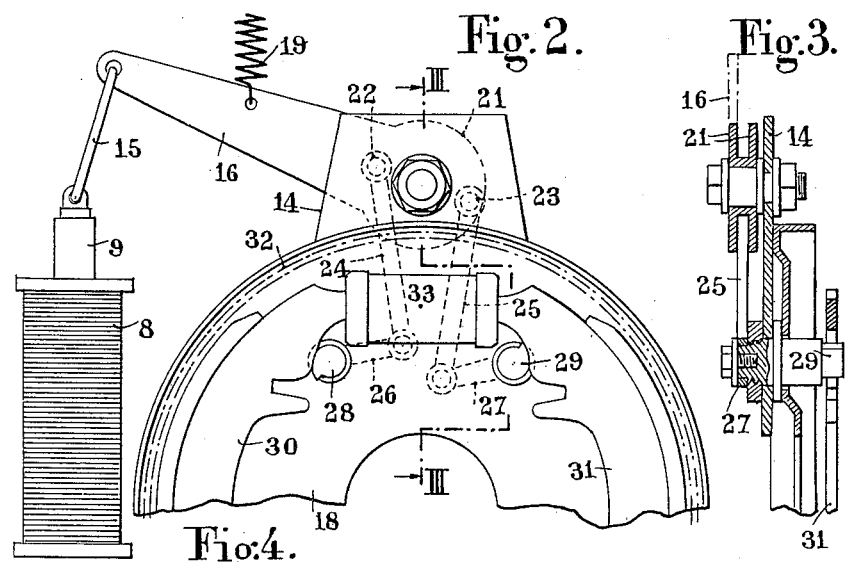
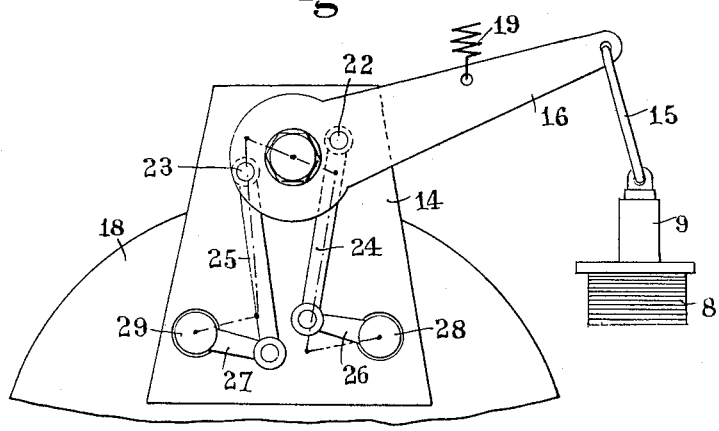

3,093,213
EMERGENCY CONTROL DEVICE FOR HYDRAULIC OR PNEUMATIC BRAKING SYSTEMS
Henri Limoges, 18 Rue des Droits de l'Homme (Allier), and Maurice Paul Limoges, 19 Rue de Pasquis, Montlucon (Allier), both of Montlucon, France
Filed May 5, 1960, Ser. No. 27,190
1 Claim. (Cl. 188—106)

Existing self-powered vehicles such as buses, trucks, goods transport vehicles, passengers cars, tractors and, as a rule, all road vehicles and many trailers, are provided with braking systems controlled by manual or mechanical control means, hydraulic control means, or pneumatic or compresesd-air control means. Hand or mechanical brake control means are now confined to the actuation of brakes for parking, emergency or like purposes, or in case of faulty operation of the main braking system, but it is well-known that this type of brake control means is of dubious efficiency as an emergency device in that the deceleration thus obtained is of very low value and unsuitable for stopping the vehicle.

On the other hand, hydraulic braking systems and pneumatic servo-systems (that is, braking system wherein the brake control action is transmitted through hydraulic or compressed-air circuits) become inoperative in case of leakage or faulty condition of the fluid circuits.

It is the essential object of this invention to provide a device adapted automatically to stop the vehicle in case of failure of the brake control system thereof, even if the driver is unaware of this faulty condition.

With the device of this invention, if the brake control circuit is deteriorated when the vehicle is stationary, the driver will become aware that the wheels of his vehicle are locked when he will try to start the vehicle so that he will be unable to start normally.

In either case the vehicle may be re-started in order to be driven at a slower speed and with the desired safety to the place of repair, after the brake shoes have been released.

The device of this invention is characterized mainly in that the pressure drop occurring in the brake control circuit—whether of the hydraulic or pneumatic type—is used for actuating a member causing in turn the normal operation of the brake shoes in the drums.

The member provided in the device of this invention for detecting the failure in the main braking system, that is, in the fluid-distributing circuit thereof is mounted in this circuit and so arranged that it remains inoperative as long as the brakes operate normally, but is adapted, in case of leakage in the fluid distributing circuit, to cause the operation of an auxiliary member acting upon the brakes and preferably upon the very brake shoes of the vehicle.

In the following description of the invention, an electromechanical embodiment of the device constituting the subject-matter thereof is proposed, but anybody conversant with the art will readily appreciate that any other adequate embodiment of this device which is based upon the utilization of the loss of pressure produced in the brake shoe control circuit or in any other means controlling an auxiliary brake system may be used without departing from the spirit and scope of the invention.

In the case of disk brakes, the same result may be obtained, provided that the mechanical connections are modified accordingly.

It may also be noted that any suitable alarm system, such as a tell-tale lamp or a bell, may be associated with the device of this invention for warning the driver that a faulty condition has occurred in the main braking system.

Moreover, while causing the automatic stoppage of the vehicle, any deterioration in the main braking system may also be caused to turn off either the ignition system or the fuel feed system, or any other means adapted to stop the engine.

Finally, the safety or emergency brake control system of this invention may be caused to act upon the drive wheels or upon all the wheels of which the brake shoes were used. Alternately, the number of brake shoes thus actuated may be limited according to the type and weight of the vehicle to be equipped.

The braking action may also be applied gradually by either effecting successive electrical control actions producing the application of variable pressures on the brake shoes, or applying the brakes firstly to two wheels, then to the other wheels, but it will be readily understood that other equivalent means may be used without departing from the spirit and scope of the invention.

On the other hand, the braking force and its quickness of response may be calculated to suit each specific case contemplated.

A same type of auxiliary or emergency safety device according to this invention may be provided for equipping a series of vehicles of different power ratings but utilizing the same brake drums, the adjustment being consistent with the power rating of each type of vehicle.

In order to warn the drivers of other vehicles placed behind a vehicle equipped with the automatic brake control device of this invention, the ail lights and even the directional signals may be so connected as to be switched on immediately as a pressure variation occurs, even before the emergency brake application commences.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing in which:

FIGURE 1 is a diagram showing the principle of the invention;

FIGURE 2 is a front view of the emergency braking device shown with parts broken away;

FIGURE 3 is a section taken upon the line III—III of FIG. 2; and

FIGURE 4 is a view similar to FIG. 2 but taken from the opposite side.

The operation of the emergency brake control device of this invention is based on the following principle:

A cylinder 2 is branched off the hydraulic or compressed-air circuit 1 and has slidably mounted therein a piston 3 urged toward the circuit 1 by a calibrated spring 4. This piston 3 is rigid with a rod 5 carrying on its opposite end emerging from the cylinder 2 at least one contact 6 electrically isolated from the rod 5. In the inoperative position of the device the spring 4 balances the fluid pressure in the pipe line 1 and therefore the piston 3 is maintained in a position of equilibrium; in case of brake application, the pressure increase in the circuit will move the piston against the resistance of the calibrated spring 4 and when the brakes are released the piston resumes its normal operation in which it is shown, without producing any action whatsoever.

If, as a consequence of a leakage or a faulty condition in the fluid circuit, the pressure in the line 1 drops below the rated value, the spring will be allowed to expand and therefore the piston 3 will be moved towards the line 1. Thus, the contact 6 will close an electrical circuit comprising a storage battery 7 (for example the battery of the vehicle) and, for each wheel, an electromagnet coil 8 so as to attract the plunger 9 thereof. Thus, the piston movement, through the medium of the impulse produced by the properly calculated coil attraction will actuate a linkage 15, 16 operatively connected to an emergency brake. In the example illustrated the link 16 rotates a cam 10 acting directly upon a brake shoe 11 so as to press same against the inner surface of the brake drum 13, thus providing the same braking action as that normally exerted by the thrust produced by the piston of the hydraulic cylinder 12.

FIGURES 3 and 4 illustrate by way of example a mechanical embodiment of the device of this invention which is incorporated in a wheel of a vehicle.

The central plunger 9 of the electromagnet secured for example on the anchor plate 18 of the wheel brake is connected through a link 15 to a lever 16 constantly urged to its inoperative position by a spring 19 anchored to a fixed point of the vehicle.

The other end of lever 16 is rigid with a pair of parallel disks 21 carrying two trunnions 22, 23 having pivotally mounted thereon a pair of links 24, 25 adapted to cause in turn the rotation of a pair of arms 26, 27. The other ends of these arms 26, 27 are adapted to rotate a pair of cams, eccentric or like members 28, 29 pivoted on fixed pins carried by the anchor plate, these cams or like members 28, 29 being normally set very close to the inner surface of the brake shoes 30 and 31.

When a pressure loss occurs in the fluid circuit the electrical circuit energized by the storage battery is closed and the central plunger 9 of the electromagnet is attracted to its lowermost position.

The pivoted link 15 pulls the lever 16, thus causing the trunnions 22 and 23 to rotate. Due to the provision of the intermediate links 24, 25 the arms 26, 27 cause the cams 28, 29 to rotate and these cams, by engaging the brake shoes 30, 31 urge same against the inner surface of the brake drum 32 under the same conditions as those obtaining when the cylinders 33 are supplied with fluid under pressure for actuating the pistons therein.

A simple switch 34 is provided to enable the driver to open the energizing circuit of the electromagnet 8 so that the complete system may resume its initial conditions and the cams 28, 29 may release the brake shoes. Thus, the stationary vehicle is no more braked and may be driven at a slower speed with the desired safety to the place of repair, if necessary.

The pressure-drop detecting member may be mounted, if desired, inside the fluid reservoir for example and each auxiliary brake control assembly protected by an adequate casing is secured on a vehicle portion which is fixed in relation to the brake shoes, this portion consisting for example of the vertical face of the support 14 of the brake anchor plate.

The cam contour is designed as a function of the movement of links 24, 26 and 25, 27 which results from the actuation of the plunger 9 (as shown in chain-dotted lines in FIG. 4) so that the brake shoes may engage the registering brake drum surfaces with the desired force.

The detector member 2 may control the turning on of the directional signals and tail lamps, and the key switch 34 may be adapted to open the contact 5, 6 to release the emergency brake.

The contacts 6 provided in this example on the rod 5 of piston 3 may be so arranged as to operate the brake-shoe actuating members either successively or simultaneously.

It will be readily understood by anybody conversant with the art that although the present invention has been described in conjunction with a preferred embodiment, many modifications and variations may be resorted to without departing from the spirit and scope of the invention. Such modifications and variations are considered to be within the province of the invention and appended claim. Thus, notably, the leakage or pressure-drop detecting member may be disposed at any desired location of the hydraulic or pneumatic circuit, notably at the upper portion thereof, very close to or on the fluid reservoir.

In this case, and although the reservoir is full, if an instantaneous breakage or any other faulty operation occurred in the lower portion of the circuit, the brake pedal will become inoperative and will be depressed by the driver beyond the position in which it is moved when the brakes are applied with force and the braking system operates normally. Thus, this pedal will actuate a contact adapted to insert the emergency or safety braking device into the circuit.

The links 24 and 25 provided in the embodiment of this invention which is illustrated in FIGS. 2 to 4 of the drawing and whereby the cam-actuating levers 26 and 27 are preferably adjustable to different lengths so that the unequal plays developing between the brake shoes and the registering brake drums on account of an unequal wear of the brake linings can be taken up; furthermore the link 15 connecting the electromagnet plunger 9 to the lever 16 may be elastic and calibrated, if desired; moreover, the dashboard or instrument panel of the vehicle may be provided with a push-button or like device for controlling this emergency braking-system actuating means so that the driver may at any time either check its proper operation or, under certain circumstances, cause its actuation.

What we claim is:

In an automobile having road wheels, a hydraulic braking system for said road wheels including a hydraulic pressure circuit, a fixed anchor plate at each of said wheels, a brake drum fixed to each of said road wheels, a pair of brake shoes pivotally mounted on each of said anchor plates, hydraulic means for moving said brake shoes into engagement with said brake drum in response to increased pressure in said hydraulic circuit, and foot actuated control means for said hydraulic circuit, the improvement comprising, an emergency, automatic braking system for engaging said brake shoes with said drum in response to a failure in said hydraulic circuit, said emergency braking system comprising a pressure sensitive response member inserted within said hydraulic circuit including a switch closable in response to a drop of pressure in said hydraulic circuit below a predetermined limit value, an electric circuit including said switch, a battery, and an electromangetic device having a movable armature operable in response to the closing of said switch, a pair of cams pivotally mounted on said anchor plate and engaged with said brake shoes independently of said hydraulic means, a crank arm connected to each of said cams, a lever secured to the rear face of said anchor plate at a pivotal mount, a pair of connecting arms mounted at one end of their ends to said crank arms, respectively, and at the other of their ends to said lever at points removed from said pivotal mount, and link means independent of said primary braking system interconnecting said movable armature with said lever for moving said lever, said connecting arms, said cams and said brake shoes into contact with said drum when the pressure within said hydraulic circuit falls below a prescribed level and said switch is closed and said electromagnetic device is actuated.

References Cited in the file of this patent

UNITED STATES PATENTS

| | | |
|---|---|---|
| Re. 16,918 | Coatalen | Mar. 27, 1928 |
| 1,650,963 | Schauman et al. | Nov. 29, 1927 |
| 1,928,750 | Apple et al. | Oct. 3, 1933 |
| 1,984,883 | La Brie | Dec. 18, 1934 |
| 2,169,668 | Thomas | Aug. 15, 1939 |
| 2,365,557 | Keith | Dec. 19, 1944 |
| 2,670,817 | Tripp | Mar. 2, 1954 |
| 2,680,500 | Jenkins | June 8, 1954 |
| 2,862,583 | Granche | Dec. 2, 1958 |

FOREIGN PATENTS

| | | |
|---|---|---|
| 1,226,430 | France | Feb. 29, 1960 |